United States Patent
Weinberg-Sehayek et al.

(10) Patent No.: US 9,883,690 B2
(45) Date of Patent: *Feb. 6, 2018

(54) READY-TO-EAT FRESH SPAGHETTI-LIKE FISH PRODUCTS, METHODS OF MANUFACTURE THEREOF

(71) Applicant: GRADIENT AQUACULTURE

(72) Inventors: Noam Weinberg-Sehayek, Shenzhen (CN); Avraham Weinberg, Kiryat Yam (IL)

(73) Assignee: GRADIENT AQUACULTURE, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,211

(22) Filed: Sep. 12, 2016

(65) Prior Publication Data

US 2017/0049138 A1    Feb. 23, 2017

Related U.S. Application Data

(63) Continuation-in-part of application No. 14/601,765, filed on Jan. 21, 2015, which is a continuation-in-part
(Continued)

(51) Int. Cl.
*A23L 17/00*        (2016.01)
*A23L 33/00*        (2016.01)
(Continued)

(52) U.S. Cl.
CPC .............. *A23L 17/00* (2016.08); *A23L 17/40* (2016.08); *A23L 17/70* (2016.08); *A23L 33/20* (2016.08);
(Continued)

(58) Field of Classification Search
None
See application file for complete search history.

(56) References Cited

U.S. PATENT DOCUMENTS 4,704,291 A * 11/1987 Nagasaki ................ A23L 17/70
426/513
4,806,378 A    2/1989 Ueno et al.
(Continued)

FOREIGN PATENT DOCUMENTS

CN        101011164 A    8/2007
CN        101209113 A    7/2008
(Continued)

OTHER PUBLICATIONS

Rolls B.J. et al., "How flavour and appearance affect human feeding", Proceedings of Nutritions Society, Jun. 1982, Great Britain, vol. 42, No. 109, pp. 109-117.
(Continued)

*Primary Examiner* — Robert A Wax
*Assistant Examiner* — Melissa Mercier (57) ABSTRACT

The present invention provides a pasta-like shaped edible product comprising surimi, fish or portions thereof, prepared by a process consisting of the steps of:
a. chopping frozen surimi to chips;
b. introducing the surimi chips in a predetermined ratio to cold water and salt to provide a mixture;
c. providing additives to said mixture;
d. homogenizing under vacuum;
e. adding vegetable oil and homogenizing to a homogenic emulsion;
f. injecting the mass to a pasta molding head;
g. refrigerating said mass for at least about 6 hours;
h. molding a predetermined shape,;
i. transporting said molded pasta on a conveyor belt heated to about 40 to about 50 degrees Celsius;
j. cooling said edible product for about 4 hours at about 4 degrees Celsius to about 6 degrees Celsius.

19 Claims, 2 Drawing Sheets

Related U.S. Application Data of application No. PCT/IB2014/063294, filed on Jul. 22, 2014, now Pat. No. 9,462,825.

(60) Provisional application No. 61/856,807, filed on Jul. 22, 2013, provisional application No. 62/087,294, filed on Dec. 4, 2014.

(51) Int. Cl.
 *A23L 33/20* (2016.01)
 *A23L 17/40* (2016.01)

(52) U.S. Cl.
 CPC ............... *A23L 33/30* (2016.08); *A23L 33/40* (2016.08); *A23V 2002/00* (2013.01)

(56) References Cited

U.S. PATENT DOCUMENTS

| | | | |
|---|---|---|---|
| 5,028,444 | A | 7/1991 | Yamamoto et al. |
| 5,141,766 | A | 8/1992 | Miyakawa |
| 5,223,301 | A | 6/1993 | Kanda et al. |
| 2007/0172575 | A1 | 7/2007 | Gune |

FOREIGN PATENT DOCUMENTS

| | | |
|---|---|---|
| CN | 103053928 A | 4/2013 |
| WO | 2015/011634 A1 | 1/2015 |

OTHER PUBLICATIONS

Thexton A.J. et al, "Food consistency and bite size as regulators of jaw movement during feeding in the cat", Journal of Neurophysiology, Sep. 1, 1980, The American Physiological Society, vol. 44, No. 3, Abstract.
Tarozzi et al., "Correlation between Food and the Fluid Intake", International Conference on the Psychology of Food and Fluid Intake in Warsaw, 1980.
International Search Report of PCT/IB2014/063294, dated Dec. 31, 2014.
Written Opinion of the International Search Authority of PCT/IB2014/063294, dated Dec. 31, 2014.
Final Rejection Office Action issued by the USPTO for the U.S. Appl. No. 14/601,765, dated Oct. 22, 2015.
Non-Final Rejection Office Action issued by the USPTO for the U.S. Appl. No. 14/601,765, dated Feb. 12, 2016.
Non-Final Rejection Office Action issued by the USPTO for the U.S. Appl. No. 14/601,765, dated Jul. 22, 2015.
Restriction Requirement Office Action issued by the USPTO for the U.S. Appl. No. 14/601,765, dated May 28, 2015.
Response of Jan. 11, 2016 to Final Rejection Office Action issued by the USPTO for the U.S. Appl. No. 14/601,765, dated Oct. 22, 2015.
Response of May 11, 2016 to Non-Final Rejection Office Action issued by the USPTO for the U.S. Appl. No. 14/601,765, dated Feb. 12, 2016.
Response of Jul. 10, 2015 to Restriction Requirement Office Action issued by the USPTO for the U.S. Appl. No. 14/601,765, dated May 28, 2015.
Response of Oct. 6, 2015 to Non-Final Rejection Office Action issued by the USPTO for the U.S. Appl. No. 14/601,765, dated Jul. 22, 2015.
Kumar R. et al., "Surimi Technology", Oct. 14, 2010, retrieved from https://www.scribd.com/doc/39341260/Surimi-Technology#.
"The Fat Content of Fish", retrieved from http://www.weightlossforall.com/fat-content-fish.htm.
"Omega 6 and 3 in nuts, oils, meats, and fish. Tools to get it right.", May 10, 2011, retrieved from http://paleozonenutrition.com/2011/05/10/omega-6-and-3-in-nuts-oils-meat-and-fish-tools-to-get-it-right/.

\* cited by examiner

READY-TO-EAT FRESH SPAGHETTI-LIKE FISH PRODUCTS, METHODS OF MANUFACTURE THEREOF

CROSS REFERENCE TO RELATED APPLICATIONS

This application is a Continuation-in-Part of U.S. patent application Ser. No. 14/601,765, dated Jan. 21, 2015, which claims priority from U.S. Provisional Application No. 62/087,294, dated Dec. 4, 2014, and is a Continuation-in-Part of PCT International Application No. PCT/IB2014/063294, dated Jul. 22, 2014, claiming priority from U.S. Provisional Application No.: 61/856,807, dated Jul. 22, 2013.

FIELD OF THE INVENTION

The present invention generally pertains to ready-to-eat fresh pasta-like edible products, especially ready-to-eat fresh pasta-like products made of fish, fish products and Surimi and to methods of manufacture of same.

BACKGROUND OF THE INVENTION

Fish and fish products are consumed all over the world. With other seafood's, it provides the world's prime source of high-quality protein 14 to 16 percent of the animal protein consumed worldwide. Over one billion people rely on fish as their primary source of animal protein.

Fish and other aquatic organisms are also processed into various food and non-food products.

Fish and fish products are versatile and may be minced, frozen, chopped, formed, cooked, fermented, boiled, fried, breaded and processed in many ways.

Surimi is a paste made by fish or other meat, as well as multiple Asian foods that use Surimi as its primary ingredient. It is available in many shapes, forms, and textures, and often used to mimic the texture and color of the meat of lobster, crab and other shellfish. The most common Surimi product in the Western market is imitation crab meat. Such a product often is sold as imitation crab and mock crab in America, and as seafood sticks, crab sticks, fish sticks or seafood extender in Commonwealth nations. In Britain the product is sometimes known as Ocean sticks, to avoid trading standards issues regarding misadvertisement. In current production processes, lean meat from fish or land animals is first separated or minced. The meat then is rinsed numerous times to eliminate undesirable odors. The result is beaten and pulverized to form a gelatinous paste. In North America and Europe, Surimi also alludes to fish-based products manufactured using this process.

U.S. Pat. No. 5,141,766 discloses Surimi which consists essentially of the meat of catfish produced through a Surimi manufacturing process comprising the steps of mincing the meat of catfish after filleting, rinsing the minced meat, dehydrating the rinsed meat, adding condensed phosphates to the meat and mixing them together, grinding the mixture, and if desired, freezing the mixture.

U.S. Pat. No. 5,028,444 discloses a frozen Surimi product which comprises frozen Surimi and, as an effective ingredient, a mixture consisting essentially of sodium bicarbonate, calcium citrate and calcium lactate.

U.S. Pat. No. 4,806,378 discloses a method of producing frozen Surimi comprising: washing minced fish meat with a water solution, said solution containing one salt selected from the group consisting of calcium salts, magnesium salts and any combination thereof; dehydrating the washed minced fish meat; adding surface active agents to the dehydrated minced fish meat; and then freezing the resultant Surimi.

U.S. Pat. No. 5,223,301 discloses a process to produce higher grade Surimi from the flesh of fish using less fresh water comprising: mincing fish flesh into mince particles; crushing the mince particles to increase the surface area: volume ratio of the mince particles; washing the crushed mince particles with fresh water to remove water soluble proteins; dewatering the washed mince particles; refining by straining the dewatered mince particles; dewatering the refined mince particles; and mixing additives with the refined dewatered mince particles to produce Surimi.

Patent application US2007/0172575 discloses a nutritious, high protein, Zero carbohydrate pasta or bread is formed by combining animal protein with a binder, wherein the binder comprises substantially no digestible carbohydrates. A preferred composition comprises fish protein combined with guar gum. In an embodiment, odor, taste, texture, and color modifying ingredients are added, including for example a plant protein, ethyl maltol, salt, egg White, calcium carbonate, glycine, and/or polyphosphate.

Roll B. J. et al., How flavour and appearance affect human feeding. *Proc. Nutr. SOC.* (1982), 41, 109 argues that appearance of food can vary is in its shape. Changes in shape also alter the feel of food in the mouth and it is known that food consistency and bite size determine the jaw movements during feeding, see Thexton, A. J., Hiiemae, K. M. & Crompton, A. W. (1980). *J. Neurophysiol.* 44,456. It has been suggested that the muscle and neural activity associated with mastication play an important role in food preference and may affect the amount of food eaten. The shape and size of food pellets offered to rats have been found to affect food intake, see Tarozzi, G., Di Bella, L., Scalera, G. & Rossi, M. T. (1980); in Proceedings of the Seventh International Conference on the Physiology of Food and Fluid Intake, Warsaw. To determine whether shape is also an important influence on feeding in humans, Roll et al. assessed the effect of offering a variety of shapes of food on total energy intake in a meal. The foods used were different shapes of pasta served with equal portions of tomato sauce. Subjects were tested twice, once with just the favorite shape repeatedly presented, and once with three different shapes (spaghetti, bow ties and hoops) presented in three successive courses. Roll et al., have found that there was a significant enhancement (~14%, P<0.07) of intake with the variety of shapes. In the condition in which just one shape was presented it was found that the pleasantness of the food eaten decreased more than that of the foods not eaten and this could explain why the variety of shapes increased energy intake.

Thus it is a long felt need to provide ready-to-eat fresh edible products made of fish, fish products and Surimi products easily adaptable to a wide variety of tastes.

SUMMARY OF THE INVENTION

Is it hence a scope of the present invention to provide a pasta-like shaped edible product comprising surimi, fish or portions thereof, prepared by a process consisting of the steps of: chopping frozen surimi selected from the group consisting of grade A, AA, KA or FA or any combination thereof to chips; introducing the surimi chips in a predetermined ratio to cold water and salt to provide a mixture; providing additives to said mixture; homogenizing under vacuum to provide a deaerated Al dente texture to said mixture at a speed of about 2000 to about 5500 rpm under vacuum for about 1 to about 5 minutes until a homogenized mass is produced; adding vegetable oil and homogenizing to a homogenic emulsion in a maximal temperature of about 8 degrees Celsius; injecting the mass to a pasta molding head; refrigerating said mass for at least about 6 hours; molding a predetermined shape, under low pressure of no more than about 2 bar; transporting said molded pasta on a conveyor belt heated to about 40 to about 50 degrees Celsius; cooling said edible product for about 4 hours at about 4 degrees Celsius to about 6 degrees Celsius; said process provides said pasta-like shaped edible product characterized by (a) Omega 3 to Omega 6 ratio of at least 5:1; and (b) fat levels of about 1% to about 20%; wherein an additional step of drying said pasta-like shaped edible product after said step of cooling is excluded such that no additional re-cooking of said pasta-like shaped edible product is required; thereby providing a ready-to-eat pasta-like shaped edible product; and wherein said process further comprises at least one step selected from a group consisting of: pasteurizing the product; sterilizing the product; any combination thereof.

Is it hence another scope of the present invention to provide the edible product comprising surimi, fish or portions thereof further comprising a step of packaging the product.

Is it hence another scope of the present invention to provide the edible product comprising surimi, fish or portions thereof wherein said step of pasteurizing or sterilizing the product is performed by means of a rotary pasteurizer/sterilizer.

Is it hence another scope of the present invention to provide the edible product comprising surimi, fish or portions thereof wherein said step of pasteurizing is done at a temperature of about 90 degrees Celsius to about 95 degrees Celsius for about about 15 minutes to about 30 minutes thereby assuring that the product inside the packages reaches at least 85 degrees Celsius.

Is it hence another scope of the present invention to provide the edible product comprising surimi, fish or portions thereof wherein said step of sterilizing is done at a temperature of about 120 degrees Celsius to about 130 degrees Celsius for about about 15 minutes to about 35 minutes thereby assuring that the product inside the packages reaches at least 121 degrees Celsius.

Is it hence another scope of the present invention to provide the edible product comprising surimi, fish or portions thereof wherein said method further comprises a step of adding a calcium, potassium or sodium salts of multi-carboxylic acids to said step c of providing additives to said mixture.

Is it hence another scope of the present invention to provide the edible product comprising surimi, fish or portions thereof wherein said step of pasteurizing or sterilizing is performed either after or before said cooked product is packed.

Is it hence a scope of the present invention to provide a method of preparing ready-to-eat pasta-like shaped edible product having an "al-dente" texture comprising surimi, fish or portions thereof, wherein said edible product by steps of: cutting surimi, fish or portions thereof to provide a chopped mixture; admixing said chopped mixture with additives in a homogenizer; homogenizing under vacuum; extruding said homogenized mass to a form; cooking said extruded product in hot water; cooling said cooked product until it reaches room temperature; pasteurizing or sterilizing the same.

Is it hence another scope of the present invention to provide the method, wherein at least one of the following holds true: said step of homogenizing is performed from about 1 minute to about 30 minutes; said step of extruding additionally comprising a step of cutting said extruded product to a predetermined desired size; said step of cooking is performed from about 80° C. to about 90° C. from about 30 seconds to about 5 minutes; said method further comprises a step of adding a calcium, potassium or sodium salts of multi-carboxylic acids to said step b of admixing additives; any combination thereof.

Is it hence another scope of the present invention to provide the method, further comprising a step of packing predetermined portions of the product.

Is it hence another scope of the present invention to provide the method, wherein said pasteurizing or sterilizing is performed either before or after said cooked product is packed.

Is it hence another scope of the present invention to provide the method, wherein said step of pasteurizing or sterilizing is performed by means of a rotary pasteurizer/sterilizer.

Is it hence another scope of the present invention to provide the method, wherein said step of pasteurizing is done at a temperature of about 90 degrees Celsius to about 95 degrees Celsius for about 15 minutes to about 30 minutes thereby assuring that the product inside the packages reaches at least 85 degrees Celsius.

Is it hence another scope of the present invention to provide the method, wherein said step of sterilizing is done at a temperature of about 120 degrees Celsius to about 130 degrees Celsius for about 15 minutes to about 35 minutes thereby assuring that the product inside the packages reaches at least 121 degrees Celsius.

Is it hence a scope of the present invention to provide a method of preparing a pasteurized/sterilized ready-to-eat pasta-like shaped edible product having an "al-dente" texture comprising surimi, fish or portions thereof, said method comprising the steps of: cutting surimi, fish or portions thereof to provide a chopped mixture; admixing said chopped mixture with additives in a homogenizer; homogenizing under vacuum, under low pressure; extruding said homogenized mass to a form; cooking said extruded product in hot water at a temperature; cooling said cooked product until it reaches room temperature; pasteurizing or sterilizing the same; wherein said 'al dente' is defined by at least one method selected from the group consisting of: the recorded force exerted from said 'al-dente' product on a 500 N intelligent load cell after being compressed by a 75 mm diameter compression plate at a distance of 1 mm from a table and retracted at a speed of about 250 mm/min as measure by the TMS-Pro Texture Analyzer and the stickiness of said 'al-dente' product is kept in the range of from about −2N to about −6N; the recorded force applied on said 'al-dente' product in a CS-1 standard shear cell consisting of 10 blades as measure by the TMS-Pro Texture Analyzer and the firmness of said 'al-dente' product is kept in the range of about 200N to about 300N; the recorded negative force caused by said 'al-dente' product when retracting said blades at a speed of about 250 mm/min as measure by the TMS-Pro Texture Analyzer and the stickiness of said 'al-dente' product is kept in the range of from about 1500N·mm to about 2000N·mm; and any combination thereof.

Is it hence another scope of the present invention to provide the method, wherein at least one of the following holds true: said step of homogenizing is performed from about 1 minute to about 30 minutes; said step of extruding additionally comprising a step of cutting said extruded product to a predetermined desired size; said step of cooking is performed from about 80° C. to about 90° C. from about 30 seconds to about 5 minutes; said method further comprises a step of adding a calcium, potassium or sodium salts of multi-carboxylic acids to said step b of admixing additives; any combination thereof.

Is it hence another scope of the present invention to provide the method, further comprising a step of packing predetermined portions of the product.

Is it hence another scope of the present invention to provide the method, wherein said pasteurizing or sterilizing is performed either before or after said cooked product is packed.

Is it hence another scope of the present invention to provide the method, wherein said step of pasteurizing or sterilizing is performed by means of a rotary pasteurizer/sterilizer.

Is it hence another scope of the present invention to provide the method, wherein said step of pasteurizing is done at a temperature of about 90 degrees Celsius to about 95 degrees Celsius for about 15 minutes to about 30 minutes thereby assuring that the product inside the packages reaches at least 85 degrees Celsius.

Is it hence another scope of the present invention to provide the method, wherein said step of sterilizing is done at a temperature of about 120 degrees Celsius to about 130 degrees Celsius for about 15 minutes to about 35 minutes thereby assuring that the product inside the packages reaches at least 121 degrees Celsius.

DETAILED DESCRIPTION OF THE EMBODIMENTS

The following description is provided so as to enable any person skilled in the art to make use of the invention and sets forth the best modes contemplated by the inventor of carrying out this invention. Various modifications, however, will remain apparent to those skilled in the art, since the generic principles of the present invention have been defined specifically to provide an edible product comprising fish or portions thereof, said product characterized as pasta, e.g., a spaghetti-like shape. In some embodiments of the present invention a Surimi edible product, characterized as a spaghetti-like shape is provided. Furthermore, the Surimi edible product is so formed and constructed that standardized; mouth-acceptance and taste are correlated with predetermined shape and/or dimension of said product, for a given Surimi recipe.

It is well known that spaghetti and pasta are extremely popular and versatile foods, beloved by all age groups, including children. Spaghetti and pasta are high carbohydrate comfort foods, having high satiety and satiation values, and therein lies their attraction. It is also a well-established fact that the high consumption of carbohydrate rich foods such as spaghetti and pasta in the western world is a contributor to the increasing obesity of the population and the attendant complications such as increased risk of diabetes, heart disease and stroke.

It is a core feature of the present invention to provide a novel type of pasta which, whilst being in the form of pasta, is less carbohydrate rich, provides lower calories, and with a lower glycemic index, and less harmful in contributing to insulin resistance and diabetes. Consumers of this new pasta of the present invention, which is made of surimi and/or other fish products, will provide a product which has a pleasing mouth feel and food acceptance, reminiscent at least in part of traditional pasta. Special features of the product of the present invention include a texture which is 'al dente', defined as firm to the bite, which is what most people desire when they anticipate consuming pasta. Another very highly beneficial feature of the present invention is the low glycemic index of the product compared to carbohydrate rich traditional or conventional pasta. A yet further advantage of the present invention is that it provides a fish product which is perceived as being more satisfying to eat than fish itself among people who have a dislike of fish, either due to the fishy odour, or texture of fish or other sea food, since the novel pasta of the present invention is prepared by a process which ensures a far less fishy odour and cooked fish texture to the product. A further, and very major advantage of the present invention is that the novel product provides a high satiety index in comparison to cooked fish which has not been processed in this way and formed into the novel pasta. This means that a satisfying meal comprising a portion of the novel pasta of the present invention can be provided to the diner who does not usually like fish, and the portion will be of a higher satiety than a cooked fish portion, with a lower glycemic index, lower calorific value and more healthful than regular, conventional or traditional pasta.

The term 'fish or fish products' refers hereinafter to one or more members of a group including processed fish, pieces of fish, minced fish, ground fish, fish portions, pulverized fish, fish meal, hydrolyzed fish, deboned fish, fish blocks, fish fillets, fish trimmings, fish offal, raw fish, fish paste, cured fish, cooked fish or any other fish product. The fish or fish products can be preserved, frozen dried, partially dried, or reconstituted or mixed with any other edible product. The fish, fish portions or fish products can be used, in the present invention, to provide spaghetti-like products alone, or in conjunction with or instead of Surimi.

The fish can be selected from the group consisting of Alaska Pollock (Theragrachalcogramma), Atlantic cod (Gadusmorhua), Big-head pennah croaker (Pennahiamacrocephalus), Bigeyes (Priacanthusarenatus), Golden threadfin bream (Nemipterusvirgatus), Milkfish (Chanoschanos), Pacific whiting (Merlucciusproductus), shark, Swordfish, (Xiphiasgladius), Tilapia (Oreochromismossambicus, Oreochromisniloticus), Atlantic salmon (Salmo salar), Chum salmon (Oncorhynchus keta), King salmon (Oncorhynchus tshawytscha), Coho salmon (Oncorhynchus kisutch), Pink salmon (Oncorhynchus gorbuscha), Sockeye salmon, Skipjack tuna, White fish, Lake whitefish, Whiting (Merluccius Hubbsi) or any combination thereof.

The term 'ready-to-eat' refers hereinafter to a meal or food product prepared or cooked in advance, with no further cooking or preparation required before being eaten.

The term 'fresh' refers hereinafter to a meal or food product newly produced, made, gathered, etc.; not preserved by being frozen, canned, etc.; not old, spoiled, etc.; having its original qualities unimpaired.

The term 'additives' refers herein after to one or more members of a group consisting of starch such as potato starch, egg white, salt, vegetable oil, humectants, sorbitol, sugar, soy protein, seasonings, edible biocides, edible acids, enhancers such as trans-glutaminases and monosodium glutamate (MSG), flavors, cryo-protectants as preservatives while the meat paste is being mixed and cooled. It is in the scope of the invention wherein the salt (NaCl) is added (e.g., during final washing) to increase the ionic strength of meat, thereby, solubilizing actomyosin (the active component which forms gel) and that the optimum level is about 2% at pH 7.0. It is in further the scope of the invention wherein sugar (e.g., sucrose, lactose, glucose, fructose, glycerol and sorbitol) acts, as cryo-protectant and sweetener, and thus protects protein from freeze denaturation by increasing the surface tension of water as well as the amount of bound water. It is in further the scope of the invention wherein egg white modifies the rubbery texture caused by the addition of starch and to give the product a whiter and glossier appearance. Hence for example, about 10% addition imparts highest yield stress to the gel product and 20% addition gives a softer product with higher gel quality. It is in further the scope of the invention wherein phosphates are added to wash minced flesh before freezing. Phosphates used in conjunction with sugar or sorbitol and with or without salt. It enhances the cryo-protective effect of sugar. Increased in water retention is another function of phosphates. It is in further the scope of the invention wherein DSP, STP, SHMP etc. are used in at about 0.1 to about 0.3% by weight. It is in further the scope of the invention wherein starch is used to modify the texture of final product, improve gel strength of a low quality Surimi and reduce the cost of the formulation due to imbibed water (e.g., due to the gelatinization of the starch granules). Up to about 10% starch can be added. In excess, it causes Surimi products brittleness. It is in further the scope of the invention wherein colour and flavour additives are utilized in the manufacture of the product. Hence, Analog crab is added to provide orange-red surface colour that is associated with the real product. Similarly yellow color is added to white flesh to get creamy white for scallops. It is in further the scope of the invention wherein Hydrolyzed proteins, either as peptides or amino acids, are used as flavoring agents. MSG is basically an amino acid, but used as a flavor modifier and enhancer. Several artificial flavors are available for seafood analogs, compounds with the flavor of tuna, caviar, scallop, oyster, shrimp, crab, lobster, and anchovy are used.

Another additive may be a carboxylate (a.k.a. carboxylic acid salt) that improves the texture of the product. Several carboxylic acid salts may be used, mainly from the families of calcium, potassium and sodium. The carboxylic acid salt utilized may be an inorganic salt or an organic salt. If the salt is an organic salt, then the counteranion is a lower alkyl group having one to six carbon atoms that is substituted with one or two carboxy groups, for example, formic, acetate, citrate, oxalate, propionate, malonate, succinate, glutamate, and the like. Examples of calcium sources include calcium acetate, calcium butyrate, calcium carbonate, calcium chloride, calcium citrate, calcium formate, calcium fumarate, calcium lactate, calcium malate, calcium malonate, calcium phosphate (tribasic), calcium monohydrogen phosphate (dibasic), calcium dihydrogen phosphate (monobasic), calcium phosphite, calcium oxalate, calcium propionate, calcium succinate, calcium tartrate, calcium valerate, and the like. It is also preferred that the calcium salt is substantially anhydrous. The preferred salts are calcium chloride, calcium citrate, calcium carbonate, calcium phosphate (tribasic), calcium monohydrogen phosphate and calcium dihydrogen phosphate and the like. The most preferred calcium salts are calcium phosphate, calcium monohydrogen phosphate, calcium dihydrogen phosphate, calcium citrate, and the like. Similar analogous can be used from the families of potassium or sodium.

The terms 'Pasta-like surimi, fish or portions thereof or fish products' refers hereinafter in a non-limiting manner to a fish only product or a fish-containing edible product shaped e.g., in one or more elongated or rounded or twisted or chopped or tied or folded shapes, such as those selected from a group consisting of Spaghetti-like shape, namely a long, thin, cylindrical, pseudo-cylindrical or polygonal cross section; noodle-like shape, namely a long and very thin shape; Barbina-like shapes, namely Thin strands often coiled into nests, Little beards; Bigoli-like shapes, namely Thick tubes; Bucatini-like shapes, namely A thick spaghetti-like product with a hole running through the center; Capelli d'angelo-like shapes, namely A synonym of capellini, they are coiled into nests; Capellini-like shapes, namely The thinnest type of long product; Fusilli-like shapes, namely Long, thick, corkscrew shaped product that may be solid or hollow; Fusilli bucati-like shapes, namely Long coiled tubes that are hollow; Perciatelli which are identical to bucatini; Pici-like shapes, namely Very thick, long, hand rolled producy; Spaghettini-like shapes, namely Thin spaghetti; Vermicelli-like shapes, namely a traditional product round that is thicker than spaghetti; Vermicelloni-like shapes, namely Thick vermicelli which are Large or little worms-like products; Ziti-like shapes, namely Long, narrow hose-like tubes sized smaller than rigatoni but larger than mezzani; Zitoni-like shapes, namely Wider version of Ziti; Zitoni-like shapes, namely Large ziti; Biangbiang noodles like shapes, namely Very wide ribbon cut rice noodles; Ciriole-like shapes, namely Thicker version of chitarra; Fettuce-like shapes, namely Wider version of fettuccine; Fettuccine-like shapes, namely Ribbon of product approximately 6.5 millimeters wide; Fettucelle-like shapes, namely Narrower version of fettuccine; Lagane-like shapes, namely Wide noodles; Lasagne-like shapes, namely Very wide noodles that often have fluted edge; Lasagnette-like shapes, namely Narrower version of lasagna; Little lasagne-like shapes, namely Longer version of lasagna; Linguettine-like shapes, namely Narrower version of linguine; Linguine-like shapes, namely Flattened spaghetti; Mafalde-like shapes, namely Short rectangular ribbons; Mafaldine-like shapes, namely Long ribbons with ruffled sides; Pappardelle-like shapes, namely Thick flat ribbon; Pillus-like shapes, namely Very thin ribbons; Pizzoccheri-like shapes, namely a type of short tagliatelle, a flat ribbon product; Sagnarelli-like shapes, namely Rectangular ribbons with fluted edges; Scialatelli or scilatielli-like shapes, namely Homemade long spaghetti with a twisted long spiral; Shahe fen-like shapes, namely Ribbon cut rice-like noodles; Spaghetti allachitarra-like shapes, namely products Similar to spaghetti, except square rather than round; Stringozzi-like shapes, namely those Similar to shoelaces; Tagliatelle-like shapes, namely Ribbon, generally narrower than fettuccine; Taglierini-like shapes, namely Thinner version of tagliatelle; Trenette-like shapes, namely Thin ribbon ridged on one side; Tripoline-like shapes, namely Thick ribbon ridged on one side; Calamarata-like shapes, namely Wide ring shaped product Squid-like; Calamaretti-like shapes, namely Little squids-like products; Cannelloni-like shapes, namely Large stuffable cylindrical (tube) product; Cavatappi-like shapes, namely Corkscrew-shaped macaroni; Chifferi-like shapes, namely Short and wide macaroni; Ditalini-like shapes, namely Short tubes; Elicoidali-like shapes, namely slightly ribbed tube product, the ribs are corked as opposed to those on rigatoni; Fagioloni-like shapes, namely Short narrow tube; Fideua-like shapes, namely Short and thin tubes; Garganelli-like shapes, namely a square shape rolled into a tube; Gemelli-like shapes, namely a single S-shaped strand of product twisted in a loose spiral; Gomiti-like shapes, namely Bent tubes; Elbows Maccheroncelli-like shapes, namely Hollow tube-shaped product that is slightly smaller than a pencil in thickness; Maltagliati-like shapes, namely a short and wide with irregular or diagonally cut ends; Manicotti-like shapes, namely large stuffable ridged tubes; Marziani-like shapes, namely Short spirals; Mezzi bombardoni-like shapes, namely Wide short tubes; Mostaccioli-like shapes, namely Similar to penne but without ridges; Paccheri-like shapes, namely Large tube product that may be prepared with a sauce atop them or stuffed with ingredients; Pasta al ceppo-like shapes, namely a sheet product that is similar in shape to a cinnamon stick; Penne-like shapes, namely Medium length tubes with ridges, cut diagonally at both ends; Penne rigate-like shapes, namely Penne with ridged sides; Penne lisce-like shapes, namely Penne with smooth sides; Penne zita-like shapes, namely Wider version of penne; Pennette-like shapes, namely Short thin version of penne; Pennoni-like shapes, namely a wider and thicker version of penne: a tube product with a diagonal cut on both ends; Rigatoncini-like shapes, namely Smaller version of rigatoni; Rigatoni-like shapes, namely Medium-Large tube with square-cut ends, sometimes slightly curved; Rotini-like shapes, namely product shape related to fusilli, but has a tighter helix, i.e. with a smaller pitch, Helix- or corkscrew-shaped product; Sagne 'ncannulate-like shapes, namely Long tube formed of twisted ribbon; Spirali-like shapes, namely a tube which spirals round; Spiralini-like shapes, namely More tightly-coiled fusilli; Trenne-like shapes, namely Penne shaped as a triangle; Trennette-like shapes, namely Smaller version of trenne; Tortiglioni-like shapes, namely Narrower rigatoni; Tuffoli-like shapes, namely Ridged rigatoni; Campanelle-like shapes, namely Flattened bell-shaped product with a frilly edge on one end; Capunti-like shapes, namely Short convex ovals resembling an open empty pea pod; Casarecce-like shapes, namely Short lengths rolled into a S shape; Cavatelli-like shapes, namely Short, solid; Cencioni-like shapes, namely Petal shaped, slightly curved with rough convex side; Conchiglie-like shapes, namely Seashell shaped shells; Conchiglioni-like shapes, namely Large, stuffable seashell shaped; Creste di galli-like shapes, namely Short, curved and ruffled; Croxetti-like shapes, namely Flat coin-shaped discs stamped with coats of arms; Farfalle-like shapes, namely Bow tie or butterfly shaped; Farfalloni-like shapes, namely Larger bow ties; Fiorentine-like shapes, namely Grooved cut tubes; Fiori-like shapes, namely Shaped like a flower; Foglie d'ulivo-like shapes, namely Shaped like an olive leaf; Gigli-like shapes, namely Cone or flower shaped Lilies; Gramigna-like shapes, namely Short curled lengths of product Infesting weed, esp. scutch-grass; Lanterne-like shapes, namely Curved ridges; Lumache-like shapes, namely Snailshell-shaped pieces; Lumaconi-like shapes, namely large snail shell-shaped pieces; Maltagliati-like shapes, namely Flat roughly cut triangles Badly cut; Mandala-like shapes; Orecchiette-like shapes, namely Bowl- or ear-shaped product; Pipe-like shapes, namely Very similar to Lumaconi but has lines running the length of it; Quadrefiore-like shapes, namely Square with rippled edges; Radiatori-like shapes, namely Shaped like radiators; Ricciolini-like shapes, namely Short wide noodles with a 90-degrees twist; Ricciutelle-like shapes, namely Short spiraled noodles; Rotelle-like shapes, namely Wagon wheel-shaped product; Rotini-like shapes, namely 2-edged spiral, tightly wound, some vendors and brands are 3-edged and sold as rotini; Sorprese-like shapes, namely Bell shaped product with a crease on one side and has a ruffled edge; Sorprese Lisce-like shapes, namely Bell shaped product with a crease on one side and has a ruffled edge (A larger version of Sorprese); Strozzapreti-like shapes, namely Rolled across their width; Torchio-like shapes, namely Torch shaped; Trofie-like shapes, namely Thin twisted product; Acini di pepe-like shapes; Alfabeto-like shapes, namely product shaped as letters of the alphabet; Anellini-like shapes, namely Smaller version of anelli Little rings; Couscous-like shapes, namely Grain-like product; Conchigliette-like shapes, namely Small shell-shaped product; Corallini-like shapes, namely Small short tubes of product; Ditali-like shapes, namely Small short tubes; Ditalini-like shapes, namely Smaller versions of ditali; Farfalline-like shapes, namely Small bow tie-shaped product; Funghini-like shapes, namely Small mushroom-shaped product; Grattini-like shapes, namely Small granular, irregular shaped product (smaller version then Grattoni; Grattoni-like shapes, namely Large granular, irregular shaped product; Midolline-like shapes, namely Flat teardrop shaped product (similar to Orzo but wider); Occhi di pemice-like shapes, namely Very small rings of product; Orzo (also, risoni)-like shapes, namelyRice shaped product; Pastina-like shapes, namely Small spheres about the same size or smaller than acini di pepe; Pearl Pasta-like shapes, namely Spheres slightly larger than acini di pepe; Quadrettini-like shapes, namely Small flat squares of product; Stelline-like shapes, namely Smaller version of stele; Stortini-like shapes, namely Smaller version of elbow macaroni; Agnolotti-like shapes, namely Semicircular pockets; Cannelloni-like shapes, namely Rolls of product with various fillings, usually cooked in an oven; Cappelletti-like shapes, namely Square of dough, filled with minced meat, and closed to form a triangle Little caps; Casoncelli or casonsèi-like shapes, namely A stuffed product typical of Lombardy, with various fillings; Casunziei-like shapes, namely A stuffed product typical of the Veneto area, with various fillings; Fagottini-like shapes, namely A 'purse' or bundle of product; Maultasche-like shapes, namely a product stuffed with meat and spinach; Mezzelune-like shapes, namely Semicircular pockets; about 2.5 in. diameter-Half—moons; Occhi di lupo-like shapes, namely A large, penne-shaped product that is stuffed Ribbed wolf eyes; Pelmeni-like shapes, namely Russian dumplings; Sacchettoni-like shapes, namely Large little sacks; Tortellini-like shapes, namely Ring-shaped, stuffed with a mixture of meat and cheese; Tortelloni-like shapes, namely Round or rectangular, similar to ravioli, and any mixture or combination or derivative thereof.

The terms "Fishy odour" and "Fishy smell" refer to the unpleasant smell that people who are not fond of fish often refer to. It is not necessarily an indicator of fish spoilage, yet an important number of people refrain from fish consumption because of it. The present invention discloses steps of substantially reducing the fishy odour by rinsing the starting surimi or fish blocks or chipped fish blocks with water at about 0 to about 3 degrees Celsius, at least twice. The fishy odour is reduced from portions of the spaghetti or pasta product of the present invention as measured by sensory methods or biochemical methods compared to a portion of the same fish not so processed.

The term 'Pasteurization' refers hereinafter to any process that kills microbes (mainly bacteria) in food and drink, such as milk, juice, canned food, and others.

The term 'Sterilization' refers hereinafter to any process that eliminates (removes) or kills (deactivates) all forms of life and other biological agents (such as prions, as well as viruses which some do not consider to be alive but are biological pathogens nonetheless), including transmissible agents (such as fungi, bacteria, viruses, prions, spore forms, unicellular eukaryotic organisms such as Plasmodium, etc.) present in a specified region, such as a surface, a volume of fluid, medication, or in a compound such as biological culture media. Sterilization can be achieved with one or more of the following: heat, chemicals, irradiation, high pressure, and filtration. Sterilization is distinct from disinfection, sanitization, and pasteurization in that sterilization kills, deactivates, or eliminates all forms of life and other biological agents.

The term 'carboxylic acid' refers hereinafter to any organic compound that contains a carboxyl group (C(O)OH). The general formula of a carboxylic acid is R—C(O)OH, with R referring to the rest of the (possibly quite large) molecule.

The term 'carboxylate' refers hereinafter to any salt or ester of a carboxylic acid. Carboxylate salts have the general formula M(RCOO)n, where M is a metal and n is 1, 2, . . . ; carboxylate esters have the general formula RCOOR'. R and R' are organic groups; R'≠H.

The term 'about' refers in this patent to a value being bigger or smaller less than 20% of the defined measure.

It is well within the scope of the invention wherein the hereto described edible product is provided in one color, or alternatively in two colors or more. It is also in the scope of the invention wherein the edible product is provided in true color, namely the color of the original food product, its sauce etc.

The glycemic index or glycemic index (GI) is a number associated with a particular type of food that indicates the food's effect on a person's blood glucose (also called blood sugar) level. The number typically ranges between 50 and 100, where 100 represent the standard, an equivalent amount of pure glucose.

'Al dente' is a description relating to the firmness (or texture) of cooked pasta, but how sticky the product is also has a critical influence on the consumer's perception of the perfect serving. Traditionally, a technician simply pinched a sample piece between their fingers to make a subjective decision. Despite being highly-trained, the method results in variation so an objective way of measuring the stickiness is needed. A food texture analyzer provides a repeatable test in order to better understand the effect of processing and cooking times on quality of the product.

In the present invention, the 'al dente' texture of the product is either measured manually or by using equipment such as a Food Technology Corporation (FTC) TMS-Pro Texture Analyzer fitted with a 500 N intelligent loadcell and a 75 mm diameter compression plate. When evaluated using equipment, the following rationale and protocol was used (http://www.foodtechcorp.com/pasta-stickiness, incorporated hereinafter as reference):

Rationale of the Method and Protocol

Is well-cooked pasta the same as pasta that is cooked well? The elusive 'al dente' condition is a description relating to the firmness (or texture) of cooked pasta, but how sticky the product is also has a critical influence on the consumer's perception of the perfect serving. Traditionally, a technician simply pinched a sample piece between their fingers to make a subjective decision. Despite being highly-trained, the method results in variation so an objective way of measuring the stickiness is needed. A food texture analyzer provides a repeatable test in order to better understand the effect of processing and cooking times on the quality of the product.

Method

A Food Technology Corporation (FTC) TMS-Pro Texture Analyzer was fitted with a 500 N intelligent loadcell and a 75 mm diameter compression plate. Overcooking pasta produces a product that is stickier, because it allows more time for starch to be released. For the control batch, a serving of farfalle (or bowtie) pasta was cooked according to the supplier's recommended instructions of 12-14 minutes in boiling water to achieve the 'al dente' texture. The overcooked sample remained in the water for 18 minutes. The batch of cooked pasta was rinsed briefly in a colander to cool, then an individual piece removed and immediately tested.

For each test, the sample was placed on the lower table and the TL-Pro test program moved the compression plate down to a distance of 1 mm from the table. The program paused the plate for 3 seconds to allow the pasta to stick to the surfaces and then moved the plate back up at a speed of 250 mm/min. The software program recorded the force exerted on the load cell from after the pause, and on completion of the test cycle, automatically calculated the negative peak value. For each repeat of the test, both contact surfaces were cleaned and dried to ensure consistent test conditions.

Results

Figure 1:
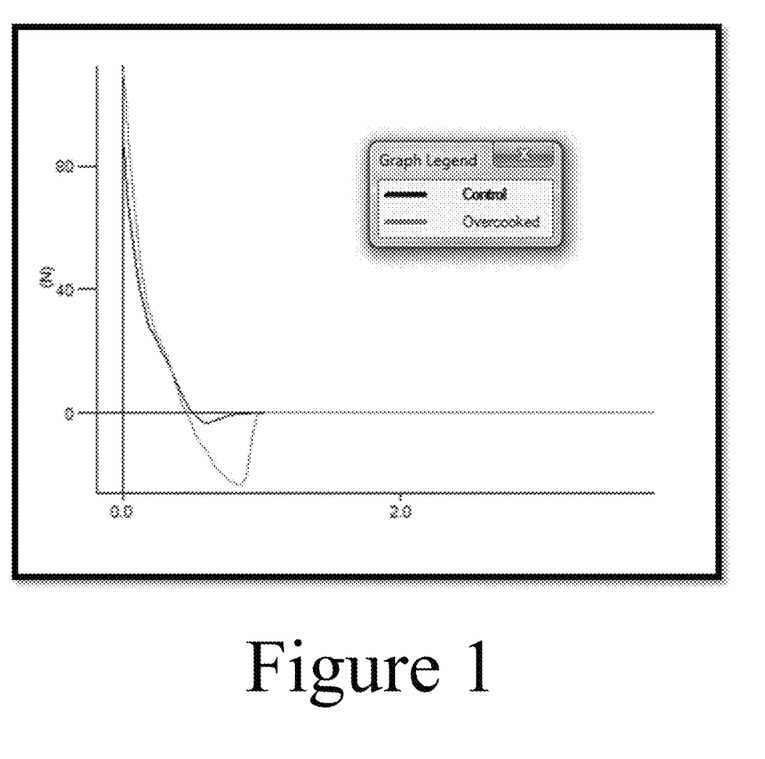
FIG. 1 shows the graphical representation of a firmness test result.

The graphical representation from TL-Pro software, of a typical test result for each sample, is shown in FIG. 1 (force applied, against cumulative displacement), starting from the maximum compression as the plate moves back up.

The graph shows a reducing compression force as the pasta relaxes back to shape, as the plate moves upwards. The curve crosses the X-axis as tension due to stickiness occurs and then reduces. This trough indicates the force exerted by the sticking of the pasta to the table and compression plate.

The same results with additional calculations are shown here.

| Sample | Stickiness (N) | Sample | Stickiness (N) |
|---|---|---|---|
| Control | −3.32 | Overcooked | −20.74 |
| Control | −4.30 | Overcooked | −22.17 |
| Control | −3.17 | Overcooked | −23.46 |
| Average | −3.59 | Average | −22.12 |
| SD | 0.61 | SD | 1.36 |
| CV | 17% | CV | 6.6% |

Average=arithmetic mean; SD=standard deviation; CV=coefficient of variation (SD/Mean)×100

Significance

The results here show that a food texture analyzer is able objectively to measure the stickiness of pasta providing confidence in the recommended cooking time. Despite the relatively small difference (approximately 4 minutes) the overcooked sample was measurably stickier than the control sample. The benefits of this technique are clear, and its applicability to any shape of pasta product as a means of accurately evaluating the effect of formulation or cooking parameters, further emphasizes its suitability. The processor will now be able to make quick and reliable decisions based on objective data that has been correlated with established sensory information.

Another method used in the present invention to assess the 'al dente' texture of the final product is as follows (http://www.foodtechcorp.com/pasta-firmness-and-cook-profile,incorporated hereinafter as reference):

Method

Before testing, enough pasta was cooked to perform several replications. For this particular test, penne pasta was used but this method could be applied to any number of pasta shapes. In order to show a difference in the product, different cook times were used. After the pasta cooked, drained, and cooled it was ready to be tested. 100 grams of pasta was placed in a CS-1 standard shear cell. This cell consists of 10 blades that first compress and then shear through the product. The force required to do this is a good indicator of the firmness of the pasta. Additionally, the negative force caused by the pasta when the blades are retracting is an indication of the stickiness of the sample. Both of these are important factors in the consumer's overall impression of the product.

Results

Figure 2:
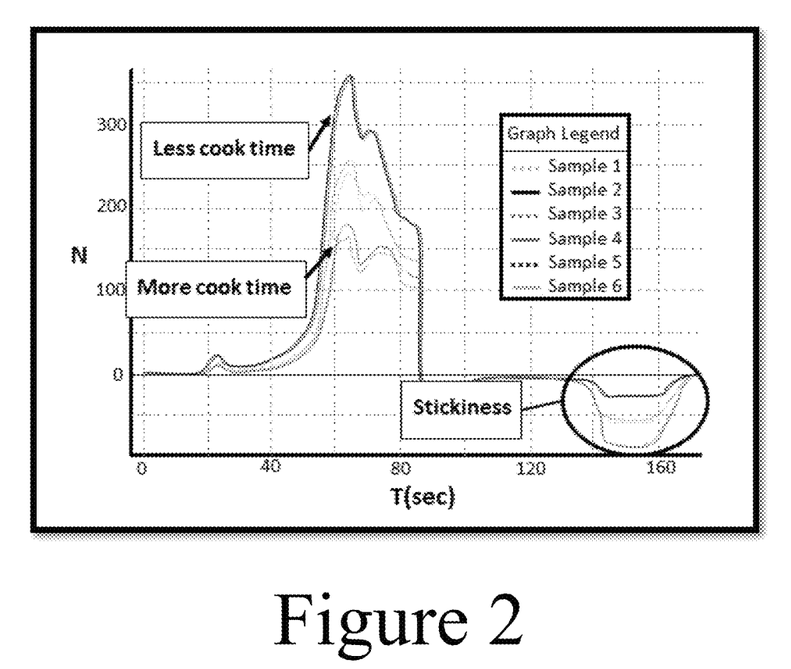
FIG. 2 shows the graphical representation of another firmness test result.

The graphical representation from CS-1 standard shear cell, of a typical test result for each sample, is shown in FIG. 2.

The same results with additional calculations are shown here.

|  | Firmness | Stickiness |
|---|---|---|
|  |  | Units |
| Result Info. | N | N · mm |
| Normal | 245.2 | 1792.5 |
| Normal | 259.5 | 1691.1 |
| Overcooked | 162.3 | 1135.4 |
| Overcooked | 182.3 | 1212.7 |
| Undercooked | 354.9 | 2572.8 |
| Undercooked | 359.2 | 2698.2 |

Therefore, it is a scope of the present invention to provide a ready-to-eat pasta-like shaped edible product having an 'al-dente' texture comprising surimi, fish or portions thereof, wherein said 'al-dente' texture is measured by means of either a Texture Analyzer with an intelligent loadcell and a compression plate, a standard shear cell, or both.

It is also a scope of the present invention to provide a ready-to-eat pasta-like shaped edible product having an 'al-dente' texture comprising surimi, fish or portions thereof, wherein said 'al-dente' texture is measured by the pasta's stickiness (N) and preferably is from about −2N to about −6N.

It is also a scope of the present invention to provide a ready-to-eat pasta-like shaped edible product having an 'al-dente' texture comprising surimi, fish or portions thereof, wherein said 'al-dente' texture is measured by the pasta's stickiness (N.mm) and preferably is from about 1500N·mm to about 2000N·mm.

It is also a scope of the present invention to provide a ready-to-eat pasta-like shaped edible product having an 'al-dente' texture comprising surimi, fish or portions thereof, wherein said 'al-dente' texture is measured by the pasta's firmness (N) and preferably is from about 200N to about 300N.

The 'al dente' texture is extremely important from a culinary point of view.

In order to emphasize this point here is an example which explain the importance of 'al dente' in pasta. In an article written by Nancy Harmon Jenkins (http://www.nytimes.com/1997/09/17/dining/italy-truth-about-pasta-italians-know-that-less-more-call-for-return-basics.html?pagewanted=all, incorporated hereinafter as reference) is mentioned the following:

"According to every Italian I know, overcooking is the single most common American failing. Yet, we all know what pasta al dente means, or think we do. It's pasta that is tender through and through but that still retains a pleasant, slightly chewy texture. Carlo Latini, whose small family firm in the Marche region on the Adriatic Sea produces pasta by old-fashioned, low-temperature, artisanal methods from wheat grown to his own specifications, is very precise about it: when you cut into a strand of cooked spazhetti, it will appear cooked through, except for a white ghost, a tiny spot of not-quite-rawness, at the center of the strand. Mr. Latini calls this the anima, the soul of the pasta. The only way to tell when pasta is done is to test. And test again. At the precise moment the pasta is ready, it must be drained, sauced and served. So, it's important to have a colander, sauce and a warm serving dish ready as soon as the water is put on to boil. On the al dente front, good pasta cooks learn to trust their instincts. When pasta is al dente, don't chicken out. Dump it into the colander immediately, remembering that residual heat will cook it just a little more."

As can be understood, the 'al dente' is not just a 'nice to have' characteristic in the pasta, in the Italian culture is compared to 'the soul' of the pasta.

It is a scope of the present invention to provide a method of preparing ready-to-eat pasta-like shaped edible product having an 'al-dente' texture comprising surimi, fish or portions thereof. And of course, the pasta thereof.

The following examples will provide methods to achieve a ready-to-eat pasta-like shaped edible product having an 'al-dente' texture comprising surimi, fish or portions thereof.

EXAMPLE 1

In the following example, a non-limiting method of providing the product of the present invention is disclosed.

A pasta-like shaped edible product comprising surimi, fish or portions thereof, prepared by a process consisting of the steps of:

a. chopping frozen surimi selected from the group consisting of grade A, AA, KA or FA or any combination thereof to chips;

b. introducing the surimi chips in a predetermined ratio to cold water and salt to provide a mixture;

c. providing additives to said mixture;

d. homogenizing under vacuum to provide a deaerated Al dente texture to said mixture at a speed of about 2000 to about 5500 rpm under vacuum for about 1 to about 5 minutes until a homogenized mass is produced;

e. adding vegetable oil and homogenizing to a homogenic emulsion in a maximal temperature of about 8 degrees Celsius;

f. injecting the mass to a pasta molding head;

g. refrigerating said mass for at least about 6 hours;

h. molding a predetermined shape, under low pressure of no more than about 2 bar;

i. transporting said molded pasta on a conveyor belt heated to about 40 to about 50 degrees Celsius;

j. cooling said edible product for about 4 hours at about 4 degrees Celsius to about 6 degrees Celsius;

At the end of said process said pasta-like shaped edible product characterized by (a) Omega 3 to Omega 6 ratio of at least 5:1; and (b) fat levels of about 1% to about 20%. Also important is to emphasize that an additional step of drying said pasta-like shaped edible product after said step of cooling is excluded such that no additional re-cooking of said pasta-like shaped edible product is required.

In an embodiment of the present invention, once the process is done, a step of either pasteurizing or sterilizing the final product is done.

The choosing between pasteurization and sterilization depends on the final "shelf-life" period desired for the product:

I. For "shelf-life" from about 5 days to about 7 days: the just finished packaged product is neither pasteurizer nor sterilized and is kept refrigerated at a temperature from about 4 degrees Celsius to about 8 degrees Celsius and brought immediately to the stores for selling as ready-to-eat fresh food.

II. For "shelf-life" up to about 60 days: the just finished packaged product goes to a process of pasteurization, as follows:
  a. Stacking in trays several packages.
  b. Introducing said trays into an autoclave or pasteurization tunnel, at a temperature from about 90 degrees Celsius to about 95 degrees Celsius for about to 15 minuets to about 30 minutes, assuring that the product inside the packages reaches at least 85 degrees Celsius.
  c. Cooling autoclaved packaged product to a temperature from about 2 degrees Celsius to 4 degrees Celsius, and keeping it at that temperature for the duration of the shelf-life.

III. For "shelf-life" from about 12 months to about 18 months: the just finished packaged product goes to a process of sterilization, as follows:
  a. Stacking in trays several packages.
  b. Introducing said trays into an autoclave at a temperature from about 120 degrees Celsius to about 130 degrees Celsius for about 15 minutes to about 35 minutes, assuring that the product inside the packages reaches at least 121 degrees Celsius.
  c. Cooling autoclaved packaged product to room temperature.

In an embodiment of the present invention, once the process is done, the final product is a ready-to-eat pasta-like shaped edible product.

EXAMPLE 2

In the following example, another non-limiting method of providing the product of the present invention is disclosed.

In this case pasta is made from high grade SA Surimi; Steps include:
  a. defrosting surimi, fish or portions thereof;
  b. cutting said surimi, fish or portions thereof in a cutter;
  c. admixing said cut surimi, fish or portions thereof and additives in a homogenizer;
  d. homogenizing under vacuum for about 1 minute, under low pressure until an homogenized mass is provided;
  e. extruding said homogenized mass to a form and cutting it to provide it with size;
  f. cooking said extruded product in hot water at a temperature from about 80° C. to about 90° C. for at least 30 seconds;
  g. cooling said cooked product until it reaches room temperature;
  h. weighing and packing predetermined portions of the product.

Depending on the final "shelf-life" period desired for the product, 3 possible continuations of the process may occur:

I. For "shelf-life" from about 5 days to about 7 days: the just finished packaged product is kept refrigerated at a temperature from about 4 degrees Celsius to about 8 degrees Celsius and brought immediately to the stores for selling as ready-to-eat fresh food.

II. For "shelf-life" up to about 60 days: the just finished packaged product goes to a process of pasteurization, as follows:
  a. Stacking in trays several packages.
  b. Introducing said trays into an autoclave or pasteurization tunnel, at a temperature from about 90 degrees Celsius to about 95 degrees Celsius for about 15 minutes to about 30 minutes, assuring that the product inside the packages reaches at least 85 degrees Celsius.
  c. Cooling autoclaved packaged product to a temperature from about 2 degrees Celsius to 4 degrees Celsius, and keeping it at that temperature for the duration of the shelf-life.

III. For "shelf-life" from about 12 months to about 18 months: the just finished packaged product goes to a process of sterilization, as follows:
  a. Stacking in trays several packages.
  b. Introducing said trays into an autoclave at a temperature from about 120 degrees Celsius to about 130 degrees Celsius for about 15 minutes to about 35 minutes, assuring that the product inside the packages reaches at least 121 degrees Celsius.
  c. Cooling autoclaved packaged product to room temperature.

Contrary to what is disclosed in the closest prior art mentioned above (US2007/0172575), the pasta of the present invention is never dry. It is always ready-to-eat and do not require any further steps of cooking. The steps of pasteurizing or sterilizing are done after the packaging step, therefore ensuring that the fresh pasta is never exposed to external contaminations after said step of pasteurizing or sterilizing.

EXAMPLE 3

In order to assess whether the ready-to-eat pasta-like shaped edible product having an 'al-dente' texture comprising surimi, fish or portions thereof (referred hereinafter as the product) still comprises its 'al dente' texture, the final product was evaluated following the same procedures as mentioned above after the step of pasteurization or sterilization.

The experiments showed that static pasteurization devices provided a final product that was not homogeneous in its 'al dente' texture. Differences in the texture of the pasta were found in the packaged product and also between different packages, after the pasteurization process in a static pasteurizer. Therefore a rotary pasteurizer was used in order to assess homogeneity after the process. The results showed that, the use of a rotary pasteurizer provided a final product with the same texture inside each of the pasteurized packages. Furthermore, this process assured that the final product is 100% pasteurized or sterilized. This point is extremely important for the safety of the consumers and the international regulations on edible products made of surimi, fish or portions thereof.

Therefore, it is an object of the present invention to provide a product that is pasteurized or sterilized in a rotary pasteurizer.

EXAMPLE 4

It is also a scope of the present invention to provide a ready-to-eat pasta-like shaped edible product having an 'al-dente' texture comprising surimi, fish or portions thereof, said pasta is a carbohydrate-free edible product. Therefore, the final product is a 'gluten-free' product.

Other Characteristics

All the many dozens of spaghetti-like fish or fish products defined above, even when manufactured for a similar fish-based paste, differ from each other in their organoleptic appearance, flavor, mouth-acceptance and taste.

It is in the scope of the invention wherein the pasta-like fish or fish products contains about 76% water, from about 5% to about 25% protein, from about 0% (gluten-free) to about 20% carbohydrate, and from about 1% to about 20% fat and its calorie content ranges from about 50 to about 500 calories per 100 gr, preferably about 100 calories per 100 gr.

It is in the scope of the invention wherein the pasta-like fish-containing edible product of the present invention is prepared in a method selected in on a non-limiting manner from the following: Molding techniques, in which the pasta-like fish-containing edible product are produced by molding the chopped fish-containing edible product paste into the desired shape. The molding as other techniques can be done in any conventional manner known in the art. Molding may be done by either a single extrusion or a co-extrusion.

All the many dozens of pasta-like Surimi products defined above, even when manufactured for a similar fish-based paste, differ each other in their organoleptic appearance, flavor, mouth-acceptance and taste.

It is in the scope of the invention wherein the pasta-like Surimi contains about 76% water, from about 5% to about 25% protein, from about 0% (gluten-free) to about 20% carbohydrate, and from about 1% to about 20% fat and its calorie content ranges from about 50 to about 500 calories per 100 gr, preferably about 100 calories per 100 gr.

It is in the scope of the invention wherein the pasta-like Surimi of the present invention is prepared in a method selected ion a non-limiting manner form the following: Molding techniques, in which the spaghetti-like Surimi products are produced by molding the chopped Surimi paste into the desired shape and allowing it to set and form an elastic gel. The molding as other techniques can be done as presented by Rahul Kuma, see Surimi technology, currently available in: http://www.scribd.com/doc/39341260/Surimi-Technology, which is incorporated herein as a reference. Molding may be done by either a single extrusion or a coextrusion. Coextrusion gives a meat like texture, whereas the single extrusion results in a uniform and rather rubbery mouth feel. Fiberizing techniques: here the products are produced by extruding the paste into a thin sheet through a rectangular nozzle having a narrow opening e.g., 1-2 mm. The extruded sheet is then partially heat set and cut into strips of desired width by a cutter, similar to a noodle cutter, having a clearance that allows only partial cutting (<4/5 of the thickness), so that a sheet of strips results. Fine strips are preferred for the fibrous crab leg product, whereas wider strips are more suitable for the crab flakes and chunks as well as for scallop analogs. The resulting sheet of strips is folded into a rope (a bundle of fibers) by a simple narrowing device called a rope former. The rope is then colored, wrapped, and cut into a desired length by a wrapping machine. Composite-Molding: For these products, the strings or shreds of desired length are mixed with Surimi paste and extruded into a desired shape. Strings or shreds are produced either by the method just described or by shredding a block of Surimi gel into thin rectangular pieces (<1 mm thick). Texture can be manipulated by adjusting the mixing ratio of strings and shreds and Surimi paste (binder). Another type of composite-molding technique called fish ham where the Surimi is prepared by mixing the dice of e.g., cured tuna and e.g., pork into the fish paste before extrusion.

It should be noted and acknowledged that the present invention additionally discloses a method of inducing a physiologically acceptable ketosis such as to treat a patient in need of therapy for one or more of amylotrophic lateral sclerosis, and Duchenne's muscular dystrophy comprising oral administration to said patient of a ketogenic diet comprising administering portions of an edible product comprising fish or portions thereof, said product characterized as a pasta-like shape with about 5% to about 25% protein and about 1% to about 20% fat, further wherein the physiologically acceptable ketosis is characterized by blood levels of (R)-3-hydroxybutyrate of from 0.5 to 20 mM. It should be further be noted and acknowledged that the present invention additionally discloses a method of maintaining or increasing muscle mass and/or muscle strength in a mammalian subject, the method comprising providing to the mammalian subject a sufficient amount of a nutritive composition comprising comprises the following properties: a simulated gastric digestion half-life of less than 60 minutes It should yet further be noted and acknowledged that the present invention additionally discloses a method of supplementing the diet of an individual comprising a step of administering to an individual an edible product comprising fish or portions thereof, said product characterized as a spaghetti-like shape wherein said edible product is administered to said individual 0-60 minutes following a workout. It should be noted and acknowledged that the present invention additionally discloses a method of at least partially reversing weight gain, comprising: identifying an individual who experienced or who is experiencing weight gain; and administering to the individual an edible product comprising fish or portions thereof, said product characterized as a spaghetti-like shape, wherein said edible product is ketogenic and comprises about 5% to about 25% protein and about 1% to about 20% fat.

EXAMPLE 5

It is an aspect of the present invention to provide the novel edible product formed from surimi, fish or fish-like products into pasta—like or noodle-like forms or shapes. Reference is now made to experiments, such as the example below, which demonstrates that the edible products and methods for producing them of the present invention provides pasta-like, spaghetti-like or noodle-like foods from the same starting material or recipe, with a predetermined acceptance value, depending only on the diameter of the extrusion or other shape and/or dimensional parameters.

A single blind random test (24 Israeli volunteers, average age 36) defines a factorized food's acceptance value of seven fish products which were formed into noodle-like elongated and thin extruded products. The fish product was made from Alaska pollock (Theragrachalcogramma). Each of the products had a main longitudinal axis of about 7 cm and diameter ranges from about 1 mm to 4 mm. A short questionnaire was used to assess the factorized food acceptance of the noodle-like fish products as either or both (i) Chinese style noodle, and (ii) Italian style noodle (spaghetti). It has been shown that whilst Italian style noodle are to be accepted in case of elongated noodles, respectively wide diameter, D=3 mm (±0.75 mm), Chinese style noodles are to be accepted in case of respectively small diameter, D=2 mm (±0.5 mm).

Similar fish-containing ingredients, identical dressing, flavors and length thus show different taste, flavor and mouth acceptance when the diameter of noodle-like fish products is altered. Moreover, food verity is achieved by minor physical changes and increase food suitability parameters towards special requirement and traditional tastes.

EXAMPLE 6

It is an aspect of the present invention to provide the novel edible product formed from Surimi into spaghetti-like or noodle like forms or shapes. Reference is now made to experiments, such as the example below, which demonstrates that the edible products and methods for producing them of the present invention provides spaghetti like or noodle like foods from the same Surimi starting material or recipe, with a predetermined acceptance value, depending only on the diameter of the extrusion or other shape and/or dimensional parameters.

A single blind random test (24 Israeli volunteers, average age 36) defines a factorized food's acceptance value of seven Surimi-extruded noodle-like elongated and thin extruded products. The Surimi was made from Alaska pollock (Theragrachalcogramma). Each of the products had a main longitudinal axis of about 7 cm and diameter ranges from about 1 mm to 4 mm. A short questionnaire was used to assess the factorized food acceptance of the noodle-like Surimi products as either or both (i) Chinese style noodle, and (ii) Italian style noodle (spaghetti). It has been shown that whilst Italian style noodle are to be accepted in case of elongated noodles, respectively wide diameter, D=3 mm (±0.75 mm), Chinese style noodles are to be accepted in case of respectively small diameter, D=2 mm (±0.5 mm).

Similar fish-containing ingredients, identical dressing, flavors and length thus show different taste, flavor and mouth acceptance when the diameter of noodle-like Surimi is altered. Moreover, food verity is achieved by minor physical changes and increase food suitability parameters towards special requirement and traditional tastes.

In the foregoing description, embodiments of the invention, including preferred embodiments, have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated.

All such modifications and variations are within the scope of the invention as determined by the appended claims when interpreted in accordance with the breadth they are fairly, legally, and equitably entitled.

The invention claimed is:

1. A pasta-like shaped edible product comprising surimi, fish or portions thereof, prepared by a process consisting of the steps of:
   a. chopping frozen surimi selected from the group consisting of grade A, AA or FA or any combination thereof to chips;
   b. introducing the surimi chips in a predetermined ratio to cold water and salt to provide a mixture;
   c. providing additives to said mixture;
   d. homogenizing under vacuum to provide a deaerated Al dente texture to said mixture at a speed of about 2000 to about 5500 rpm under vacuum for about 1 to about 5 minutes until a homogenized mass is produced;
   e. adding vegetable oil and homogenizing to a homogenic emulsion in a maximal temperature of about 8 degrees Celsius;
   f. injecting the mass to a pasta molding head;
   g. refrigerating said mass for at least about 6 hours;
   h. molding a predetermined shape, under low pressure of no more than about 2 bar;
   i. transporting said molded pasta on a conveyor belt heated to about 40 to about 50 degrees Celsius;
   j. cooling said edible product for about 4 hours at about 4 degrees Celsius to about 6 degrees Celsius;
   k. packaging said edible product; and
   optionally,
   l. pasteurizing the product;
   m. sterilizing the product; or
   n. l and m;
   said process provides said pasta-like shaped edible product characterized by (a) Omega 3 to Omega 6 ratio of at least 5:1; and (b) fat levels of about 1% to about 20%;
   wherein an additional step of drying said pasta-like shaped edible product after said step of cooling is excluded such that no additional re-cooking of said pasta-like shaped edible product is required; thereby providing a ready-to-eat pasta-like shaped edible product.

2. The edible product comprising surimi, fish or portions thereof of claim 1, wherein said step of pasteurizing or sterilizing the product is performed by means of a rotary pasteurizer/sterilizer.

3. The edible product comprising surimi, fish or portions thereof of claim 1, wherein said step of pasteurizing is done at a temperature of about 90 degrees Celsius to about 95 degrees Celsius for about 15 minutes to about 30 minutes thereby assuring that the product inside the packages reaches at least 85 degrees Celsius.

4. The edible product comprising surimi, fish or portions thereof of claim 1, wherein said step of sterilizing is done at a temperature of about 120 degrees Celsius to about 130 degrees Celsius for about 15 minutes to about 35 minutes thereby assuring that the product inside the packages reaches at least 121 degrees Celsius.

5. The edible product comprising surimi, fish or portions thereof of claim 1, wherein said step of pasteurizing or sterilizing is performed either after or before said cooked product is packed.

6. A method of preparing ready-to-eat pasta-like shaped edible product having an "al-dente" texture comprising surimi, fish or portions thereof, wherein said edible product is prepared by steps of:
   a. cutting surimi, fish or portions thereof to provide a chopped mixture;
   b. admixing said chopped mixture with additives in a homogenizer;
   c. homogenizing under vacuum;
   d. extruding said homogenized mass to a form;
   e. cooking said extruded product in hot water;
   f. cooling said cooked product until it reaches room temperature;
   g. pasteurizing or sterilizing the same.

7. The method according to claim 6, wherein at least one of the following holds true:
   a. said step of homogenizing is performed from about 1 minute to about 30 minutes;
   b. said step of extruding additionally comprising a step of cutting said extruded product to a predetermined desired size;
   c. said step of cooking is performed from about 80° C. to about 90° C. from about 30 seconds to about 5 minutes;
   d. any combination thereof.

8. The method according to claim 6, further comprising a step of packing predetermined portions of the product.

9. The method according to claim 6, wherein said pasteurizing or sterilizing is performed either before or after said cooked product is packed.

10. The method according to claim 6, wherein said step of pasteurizing or sterilizing is performed by means of a rotary pasteurizer/sterilizer.

11. The method according to claim 6, wherein said step of pasteurizing is done at a temperature of about 90 degrees Celsius to about 95 degrees Celsius for about 15 minutes to about 30 minutes thereby assuring that the product inside the packages reaches at least 85 degrees Celsius.

12. The method according to claim 6, wherein said step of sterilizing is done at a temperature of about 120 degrees Celsius to about 130 degrees Celsius for about 15 minutes to about 35 minutes thereby assuring that the product inside the packages reaches at least 121 degrees Celsius.

13. A method of preparing a pasteurized/sterilized ready-to-eat pasta-like shaped edible product having an "al-dente" texture comprising surimi, fish or portions thereof, said method comprising the steps of:
- a. cutting surimi, fish or portions thereof to provide a chopped mixture;
- b. admixing said chopped mixture with additives in a homogenizer;
- c. homogenizing under vacuum, under low pressure;
- d. extruding said homogenized mass to a form;
- e. cooking said extruded product in hot water at a temperature;
- f. cooling said cooked product until it reaches room temperature;
- g. pasteurizing or sterilizing the same;
wherein said 'al dente' is defined by at least one method selected from the group consisting of:
  - i. the recorded force exerted from said 'al-dente' product on a "500N intelligent loadcell" after being compressed by a 75 mm diameter compression plate at a distance of 1 mm from a table and retracted at a speed of about 250 mm/min as measure by the "TMS-Pro Texture Analyzer" and the stickiness of said 'al-dente' product is kept in the range of from about −2N to about −6N;
  - ii. the recorded force applied on said 'al-dente' product in a "CS-1 standard shear cell" consisting of 10 blades as measure by the "TMS-Pro Texture Analyzer" and the firmness of said 'al-dente' product is kept in the range of about 200N to about 300N;
  - iii. the recorded negative force caused by said 'al-dente' product when retracting said blades at a speed of about 250 mm/min as measure by the "TMS-Pro Texture Analyzer" and the stickiness of said 'al-dente' product is kept in the range of from about 1500N·mm to about 2000N·mm; and
  - iv. any combination thereof.

14. The method according to claim 13, wherein at least one of the following holds true:
- a. said step of homogenizing is performed from about 1 minute to about 30 minutes;
- b. said step of extruding additionally comprising a step of cutting said extruded product to a predetermined desired size;
- c. said step of cooking is performed from about 80° C. to about 90° C. from about 30 seconds to about 5 minutes;
- d. any combination thereof.

15. The method according to claim 13, further comprising a step of packing predetermined portions of the product.

16. The method according to claim 13, wherein said pasteurizing or sterilizing is performed either before or after said cooked product is packed.

17. The method according to claim 13, wherein said step of pasteurizing or sterilizing is performed by means of a rotary pasteurizer/sterilizer.

18. The method according to claim 13, wherein said step of pasteurizing is done at a temperature of about 90 degrees Celsius to about 95 degrees Celsius for about 15 minutes to about 30 minutes thereby assuring that the product inside the packages reaches at least 85 degrees Celsius.

19. The method according to claim 13, wherein said step of sterilizing is done at a temperature of about 120 degrees Celsius to about 130 degrees Celsius for about 15 minutes to about 35 minutes thereby assuring that the product inside the packages reaches at least 121 degrees Celsius.

* * * * *